US 12,283,045 B2

(12) United States Patent
Bouyssoux et al.

(10) Patent No.: US 12,283,045 B2
(45) Date of Patent: Apr. 22, 2025

(54) MULTI-CHANNEL EXTENDED DEPTH-OF-FIELD METHOD FOR AUTOMATED DIGITAL CYTOLOGY

(71) Applicants: VITADX INTERNATIONAL, Rennes (FR); INSTITUT PASTEUR, Paris (FR); CENTRE NATIONAL DE LA RECHERCHE SCIENTIFIQUE, Paris (FR)

(72) Inventors: Alexandre Bouyssoux, Paris (FR); Riadh Fezzani, Montrouge (FR); Jean-Christophe Olivo-Marin, Sceaux (FR)

(73) Assignees: VITADX INTERNATIONAL, Rennes (FR); INSTITUT PASTEUR, Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 395 days.

(21) Appl. No.: 18/007,862

(22) PCT Filed: Jun. 4, 2021

(86) PCT No.: PCT/EP2021/065055
§ 371 (c)(1),
(2) Date: Dec. 2, 2022

(87) PCT Pub. No.: WO2021/245262
PCT Pub. Date: Dec. 9, 2021

(65) Prior Publication Data
US 2023/0237651 A1 Jul. 27, 2023

(30) Foreign Application Priority Data
Jun. 5, 2020 (EP) .................................. 20305602

(51) Int. Cl.
G06F 17/00 (2019.01)
G06T 5/20 (2006.01)
(Continued)

(52) U.S. Cl.
CPC .............. G06T 7/0012 (2013.01); G06T 5/20 (2013.01); G06T 5/50 (2013.01); G06V 10/56 (2022.01);
(Continued)

(58) Field of Classification Search
CPC .......... G06T 7/0012; G06T 5/20; G06T 5/50; G06T 2207/10024; G06V 10/56; H04N 23/676; H04N 1/40012
See application file for complete search history.

(56) References Cited

U.S. PATENT DOCUMENTS 10,055,551 B2 * 8/2018 Agaian ................ G06T 7/0012
11,010,590 B2 * 5/2021 Aragaki ............... G06V 10/457
(Continued)

FOREIGN PATENT DOCUMENTS

CN 102609931 B 4/2014

OTHER PUBLICATIONS

"A one pass Extended Depth of Field Algorithm Based on the Over complete Discrete Wavelet Transform", Bradley et al., CSSIP School of Information Technology and Electronical Engineering, The University of Queensland, St Lucia, Australia, 5 Pages, https://www.researchgate.net/publication/37618354 (Year: 2004).*
(Continued)

Primary Examiner — Mohammed H Zuberi
(74) Attorney, Agent, or Firm — Maier & Maier, PLLC

(57) ABSTRACT

A method for generating a color-faithful extended-depth-of-field (EDF) image from a color volume of 2D images acquired at different focal depths using a microscope. The method involves: generating a grayscale volume; applying
(Continued)

invertible color-to-grayscale transformation to the volume; applying wavelet transform to the grayscale volume to obtain a 3D wavelet-coefficient-matrix (WCM); selecting wavelet coefficients using a coefficient selection rule; generating a 2D-WCM and a 2D coefficient-map (CM); applying inverse transformation of the wavelet transform to the 2D-WCM to obtain a 2D grayscale EDF image; generating a 2D color-composite(CC) image; applying inverse transformation of the color-to-grayscale transformation to the 2D grayscale EDF image to obtain a 2D color EDF image; converting the 2D-CC image and the 2D color EDF image into a color space including chromaticity and intensity component(s); and concatenating, chromaticity component(s) of the 2D-CC image and intensity component(s) of the 2D color EDF image, to obtain a color-faithful EDF image.

13 Claims, 4 Drawing Sheets

(51) Int. Cl.
  *G06T 5/50*   (2006.01)
  *G06T 7/00*   (2017.01)
  *G06V 10/56*  (2022.01)
  *H04N 1/40*   (2006.01)
  *H04N 23/67*  (2023.01)

(52) U.S. Cl.
  CPC ....... *H04N 1/40012* (2013.01); *H04N 23/676* (2023.01); *G06T 2207/10024* (2013.01); *G06T 2207/10056* (2013.01); *G06T 2207/20032* (2013.01); *G06T 2207/20064* (2013.01); *G06T 2207/20221* (2013.01)

(56) References Cited

U.S. PATENT DOCUMENTS

| | | | | |
|---|---|---|---|---|
| 11,222,415 | B2* | 1/2022 | Ozcan | G06T 5/70 |
| 11,287,634 | B2* | 3/2022 | Yeh | G06V 10/764 |
| 11,482,021 | B2* | 10/2022 | Leshem | G01B 11/22 |
| 11,501,446 | B2* | 11/2022 | Chen | G06T 7/11 |
| 11,593,974 | B2* | 2/2023 | Guo | G01C 21/3837 |
| 11,605,163 | B2* | 3/2023 | Liu | G06V 10/764 |
| 11,682,192 | B2* | 6/2023 | Chukka | G06V 10/774 382/128 |
| 11,803,963 | B2* | 10/2023 | Jackson | G06F 18/217 |
| 11,946,854 | B2* | 4/2024 | Ozcan | G06T 5/60 |
| 2014/0293117 | A1* | 10/2014 | Murakami | G02B 21/365 348/349 |
| 2019/0107702 | A1* | 4/2019 | Gaiduk | G02B 21/241 |
| 2019/0272638 | A1* | 9/2019 | Mouton | G06T 7/174 |
| 2021/0158496 | A1* | 5/2021 | Bouchard | G06T 5/50 |
| 2021/0295482 | A1* | 9/2021 | Rutenberg | H04N 23/959 |
| 2023/0030424 | A1* | 2/2023 | Ozcan | G06F 18/24137 |

OTHER PUBLICATIONS

International Search Report dated Sep. 9, 2021, in International Application No. PCT/EP2021/065055 (4 pages).

Forster B et al. "Complex Wavelets for Extended Depth-Of-Field: a New Method for the Fusion of Multichannel Microscopy Images", Microscopy Research and Technique, 2004, vol. 65, pp. 33-42.

Bradley A P et al. "Virtual Microscopy with Extended Depth of Field", Research Gate, Jan. 2006, (9 pages).

* cited by examiner

MULTI-CHANNEL EXTENDED DEPTH-OF-FIELD METHOD FOR AUTOMATED DIGITAL CYTOLOGY

FIELD

The present invention relates to the field of image processing of biological samples images. In particular, the present invention relates to the field of image analysis of urine samples in the context of automated digital cytology.

BACKGROUND

One limitation of conventional light microscopy is the impossibility to obtain an entirely in-focus image of an object whose thickness, in the optical axis direction, extends beyond the depth of focus. To overcome this problem, in digital cytology a sequence of images is acquired while the object of interest is displaced along the optical axis (z-axis) direction, thereby obtaining a color volume, which comprises the sequence of acquired images and hence it is often referred to as a "stack of images", "z-stack", "3D image" or "3D image stack". Inevitably, different parts or details of the object of interest are in focus in different images of the color volume.

In order to ease the analysis and the storage of the obtained volume, one commonly used solution consists in fusing the sequence of acquired images in a single composite image. To do so, it is possible to select the image containing the most information among all the images of the volume, i.e. the stack of images. In this «best-focus» selection method almost no computation is required However, «best-focus» methods result in loss of information when the objects of interest are thicker than the depth of field of the acquisition module, for instance in presence of cell clumps.

Extended Depth of Field (EDF) methods are used to fuse the images of the z-stack into a single 2D image (EDF image) in which all the parts of the object of interest are seemingly in focus, while avoiding the loss of information associated with the previously described "best-focus" method.

EDF methods are usually classified in 3 categories: spatial domain approaches; transform-based methods, such as those based on wavelet transforms (WT), and deep-learning based methods.

One spatial domain approach, which is relatively easy to implement, consists in selecting a focused area within each image of the z-stack; then fusing the selected areas to obtain one single 2D image in which all the different parts of the object of interest are in focus.

Another example of a spatial domain approach is the smooth manifold extraction (SME) method described by A. Shihavuddin et al. in "Smooth 2D manifold extraction from 3D image stack" (2017).

One common drawback of spatial domain approaches is the loss of information in presence of thick or superposed objects of interest, such as cell clumps. Therefore, these approaches are not adapted for use on transparent and semi-transparent images, such as cytology images obtained via transmission microscopy.

Common wavelet transform-based methods include Discrete Wavelet Transform (DWT) algorithms and Stationary Wavelet Transform (SWT) algorithms A. P. Bradley and P. C. Bamford have shown, in "A One-pass Extended Depth of Field Algorithm Based on the Over-complete Discrete Wavelet Transform" (2004), that the latter is more performing.

Conventionally, wavelet transform-based methods for computing an EDF image of a stack of images consist in applying a wavelet transform algorithm on every image in the stack, thus obtaining a stack of wavelet transforms; then applying a coefficient selection rule to select the most relevant wavelet coefficients in the stack of wavelet transforms. Conventionally, the coefficient selection rules are well defined for grayscale volumes and several techniques of the prior art compute an EDF image of a stack by applying wavelet transforms on grayscale images, i.e. images comprising only one channel. Such techniques can also be applied on color images, i.e. images comprising more than one color channel. One possible approach to manage multi-channel images is to apply on each channel, in a succession: a wavelet transform, a coefficient selection strategy and an inverse wavelet transform, thereby obtaining one EDF image for each channel.

The EDF images thus obtained are then merged to obtain one color EDF image. The main drawback of this method is that it produces color saturation and/or artifacts. To overcome this problem, B. Forster et al., in "Extended Depth-of-Focus for multi-channel microscopy images: a complex wavelet approach" (2004), propose to perform a pre-processing step of color-to-grayscale conversion and a post-processing step of color reassignment. However, this color reassignment step can lead to color inaccuracies. Moreover, methods based on complex wavelet transforms (CWT), such as the method used by B. Foster et al., tend to produce ringing artifacts near the edges of the objects of interest, thus limiting the recovery of the image details.

Therefore, a major issue of EDF methods in the context of automated digital cytology is that of accurately reproduce all the details of the object of interest while preserving color fidelity.

Elevated color fidelity is needed in several fields; in urine cytopathology for instance, color is an important feature for bladder cancer detection. Urinary cytopathology is the method of choice for non-invasive detection of bladder cancer; it consists in analyzing microscopy slides containing urothelial cells, looking for abnormalities. This method gives satisfactory results for the detection of advanced cancers; however, it is time-consuming, expensive and ineffective for the detection of early-stage bladder cancers. Early detection is a key issue in order to increase patients' chances of survival while drastically reducing the cost of the treatments, which is known to be more elevated for advanced stage cancers. Automatic solutions may help the management of early-stage cancers by reducing the analysis time, thus accelerating the diagnostic process, and by improving the detection and quantification of abnormalities by means of performing segmentation algorithms.

The present invention aims to overcome the problems associated with the generation of an EDF image from a color volume in the field of image analysis of biological samples.

SUMMARY

The present invention relates to a computer implemented method for generating a color-faithful extended depth-of-field (EDF) image from a color volume of a biological sample having dimension (N, M, L) and values I(n, m, l), the voxels (n, m, l) for a fixed l going from 1 to L being images acquired at different focal depths in a z-direction using a microscope or a scanner, said method comprising the following steps:

a) receiving the color volume and generating a grayscale volume by applying an invertible color-to-grayscale transformation to said color volume;
b) applying a wavelet transform on each set of N×M voxels of the grayscale volume having a same l index and (n, m) index going from (1,1) to (N, M), so as to obtain a 3D wavelet coefficient matrix wherein the value of each voxel having a (n, m, l) index comprises a set of wavelet coefficients;
c) for each group of L voxels of the 3D wavelet coefficient matrix having a same (n, m) index and a l index going from 1 to L, selecting one set of wavelet coefficients using a predefined coefficient selection rule;
d) generating:
  a 2D coefficient map CM, wherein the value CM(n, m) of each pixel having a (n, m) index is the l index of the voxel of the 3D wavelet coefficient matrix that comprises the set of wavelet coefficients selected by the coefficient selection rule;
  a 2D wavelet coefficient matrix WCM wherein the value WCM(n, m) of each pixel having a (n, m) index is the set of wavelet coefficients selected from the 3D wavelet coefficient matrix by the coefficient selection rule;
e) applying an inverse transformation of the wavelet transform to the 2D wavelet coefficient matrix WCM so as to obtain a 2D grayscale EDF image;
f) generating a 2D color composite image CC, wherein the value CC(n, m) of each pixel having (n, m) index is the value I(n, m, l) of the voxel of the color volume having a l index equal to the value CM(n, m) of the 2D coefficient map CM;
g) applying an inverse transformation of the invertible color-to-grayscale transformation to the 2D grayscale EDF image to obtain a 2D color EDF image;
h) converting the 2D color composite image CC and the 2D color EDF image into a color space comprising at least one chromaticity component and at least one intensity component;
i) concatenating, the at least one chromaticity component of the 2D color composite image CC and the at least one intensity component of the 2D color EDF image, to obtain the color-faithful extended depth-of-field (EDF) image.

Advantageously, the method of the present invention allows accurate color reproduction and fine detail recovery in an EDF image obtained from a color volume. In particular, this method drastically reduces color inaccuracies associated with the color reassignment strategies of the prior art, without compromising the level of details.

Fine detail recovery is fundamental to achieve precise segmentation and, in the context of automated digital cytology, precise cytoplasm and nucleus segmentation is crucial (i) to improve the detection of abnormal cells; (ii) to ease cell counting and (iii) to calculate, with high accuracy, biomarkers correlated with clinically relevant information, such as the Nuclear/Cytoplasmic Ratio.

In the present method, the set of wavelet coefficients may comprise at least four wavelet coefficients and the subset of wavelet coefficients selected using a predefined coefficient selection rule may comprise at least one wavelet coefficient.

The number of wavelet coefficients in the 3D wavelet coefficient matrix depends on the decomposition level of the wavelet transform. In one embodiment, the wavelet transform comprises multiple levels of decomposition applied in succession. In one embodiment, the wavelet transform comprises only one level of decomposition, so that a color-faithful extended depth-of-field (EDF) image with fine detail recovery is obtained with less computational steps. In this embodiment, the set of wavelet coefficients comprises four wavelet coefficients and the subset of selected wavelet coefficients comprises at least one and no more than four coefficients.

In one embodiment, in the selection step a first subset of wavelet coefficients is used in a first predefined coefficient selection rule and a second subset of wavelet coefficients is used in a second predefined coefficient selection rule. In this embodiment, the step of generating a 2D wavelet coefficient matrix WCM and a 2D coefficient map CM comprises:
  generating a first 2D coefficient map;
  generating a second 2D coefficient map;
  combining the first and the second 2D coefficient maps, so as to obtain one 2D coefficient map CM.
  generating a 2D wavelet coefficient matrix WCM wherein the value WCM(n, m) of each pixel is the value of the voxel of the 3D wavelet coefficient matrix having a (n, m) index and having a l index equal to the value CM(n, m) of the obtained 2D coefficient map CM.

The value of the voxel of the 3D wavelet coefficient matrix having a l index equal to the value of the 2D coefficient map CM may comprise the full set of wavelet coefficients.

In the first 2D coefficient map, the value of each pixel having a (n, m) index is the l index of the voxel of the 3D wavelet coefficient matrix that comprises the subset of wavelet coefficients selected by the first coefficient selection rule.

In the second 2D coefficient map, the value of each pixel having a (n, m) index is the l index of the voxel of the 3D wavelet coefficient matrix that comprises the subset of wavelet coefficients selected by the second coefficient selection rule.

In the 2D wavelet coefficient matrix WCM, the set of wavelet coefficient in a pixel having a (n, m) index is the set of coefficients in the 3D wavelet coefficient matrix having the same (n, m) index and having as l index the value of the 2D coefficient maps. In this particular embodiment, the 2D coefficient maps is obtained by combining a first and a second coefficient maps.

In this embodiment, in the step of generating a first 2D coefficient map, a first 2D wavelet coefficient matrix WCM is generated as well. Similarly, in the step of generating a second 2D coefficient map, a second 2D wavelet coefficient matrix WCM is generated. However, contrarily to the first and second 2D coefficient maps, said first and second 2D wavelet coefficient matrices do not need to be combined. In fact, in this particular embodiment, the 2D wavelet coefficient matrix WCM is generated based on the first and second 2D coefficient maps.

This embodiment allows to select detail information by means of the first coefficient selection rule and to obtain a denoising effect by means of the second coefficient selection rule. The step of combining the first and the second 2D coefficient maps allows to obtain one 2D coefficient map CM from which is then computed one wavelet coefficient matrix WCM. Advantageously, the combination step allows to obtain a wavelet coefficient matrix WCM and a 2D coefficient map CM that have both detail information, obtained by means of the first coefficient selection rule, and a denoising effect, obtained by means of the second coefficient selection rule.

According to one embodiment, the step of combining the 2D coefficient maps comprises:
- filtering the first 2D coefficient map and the second 2D coefficient map, preferentially using a median filter;
- averaging the first and the second 2D coefficient maps;
- rounding the averaged 2D coefficient map so as to obtain one 2D coefficient map CM.

This embodiment allows to avoid an interpolation step. The values obtained in the rounded 2D coefficient map CM are used to select wavelet coefficients from the 3D wavelet coefficient matrix having a l index equal to said obtained values. The wavelet coefficient matrix WCM is built based on the selected coefficients.

In one embodiment, the color-faithful extended depth-of-field (EDF) image obtained with the present invention is converted to a different color space, preferentially the color space of the color volume. This allows to ease further steps of image analysis, such as segmentation, by selecting the color space in which the algorithms used in the further steps of image analysis work best.

In one embodiment, the invertible color-to-grayscale transformation is a principal component analysis (PCA). PCA has the advantage of being a standard and easy-to-implement technique for dimensionality reduction having the further advantage of being invertible.

According to one embodiment, in the step of applying a wavelet transform, a stationary wavelet transform (SWT) is applied. In presence of superimposed or partially overlapped objects, the SWT is associated with better performance metrics than other methods, such as CWT-EDF and "best-focus" methods. Moreover, in presence of color images, SWT-EDF achieves the best color fidelity when compared to other wavelet-based methods followed by color reconstruction strategies.

In one embodiment, the color volume is a biomedical image and the method further comprises a step of segmentation of the color-faithful extended depth-of-field (EDF) image. Segmentation performances are improved when the segmentation is applied to an image with fine reproduction of details and elevated color fidelity.

The present invention also relates to a system for analysis of biological samples, said system having a processor and a computation module configured to:
- receive a color volume and generating a grayscale volume by applying an invertible color-to-grayscale transformation to the color volume;
- apply a wavelet transform on each set of N×M voxels of the grayscale volume having a same l index and (n, m) index going from (1,1) to (N, M), so as to obtain a 3D wavelet coefficient matrix wherein the value of each voxel having a (n, m, l) index comprises a set of wavelet coefficients;
- select, for each group of L voxels of the 3D wavelet coefficient matrix having a same (n, m) index and a l index going from 1 to L, one set of wavelet coefficients using a predefined coefficient selection rule;
- generate a 2D wavelet coefficient matrix WCM wherein the value WCM(n, m) of each pixel having a (n, m) index is the set of wavelet coefficients selected from the 3D wavelet coefficient matrix by the coefficient selection rule;
- generate a 2D coefficient map CM, wherein the value CM(n, m) of each pixel having a (n, m) index is the l index of the voxel of the 3D wavelet coefficient matrix that comprises the set of wavelet coefficients selected by the coefficient selection rule;
- apply an inverse transformation of the wavelet transform to the 2D wavelet coefficient matrix WCM so as to obtain a 2D grayscale EDF image;
- generate a 2D color composite image CC, wherein the value CC(n, m) of each pixel having (n, m) index is the value I(n, m, l) of the voxel of the color volume having a l index equal to the value CM(n, m) of the 2D coefficient map CM;
- apply an inverse transformation of the invertible color-to-grayscale transformation to the 2D grayscale EDF image to obtain a 2D color EDF image;
- convert the 2D color composite image CC and the 2D color EDF image into a color space comprising at least one chromaticity component and at least one intensity component;
- concatenate, the at least one chromaticity component of the 2D color composite image CC and the at least one intensity component of the 2D color EDF image, to obtain a color-faithful extended depth-of-field (EDF) image.

According to one embodiment, the system for analysis of biological samples according to the present invention is an automated digital cytology system for the analysis of urine sample. In this embodiment, the system further comprises an acquisition module configured to acquire a color volume, the color volume comprising at least two color images.

According to one embodiment, the system of the present invention is a bladder cancer detection system.

The present invention also relates to a computer program product for analysis of biological samples, the computer program product comprising instructions which, when the program is executed by a computer, cause the computer to carry out the steps of the method according to the present invention.

The present invention also relates to a computer-readable storage medium comprising instructions which, when the program is executed by a computer, cause the computer to carry out the steps of the method according to any one of the embodiments described hereabove.

Definitions

In the present invention, the following terms have the following meanings:
- "stack" refers to a volume comprising at least two 2D images acquired with a microscope at different focal depths in the direction of the optical axis of a microscope.
- "EDF image" refers to a 2D image obtained from a stack of 2D images, i.e. from a volume, via an extended depth-of-field method.
- "color space" refers to the mathematical representation of a color in a coordinate axis system, each color being defined by a vector whose projections on the axis of the coordinate axis system are the different components of the color in said color space.
- "chromaticity component" refers to the projection of a color vector in a color space, on an axis comprising chrominance values and not comprising luminance values. A chromaticity component can contain a part or the whole chrominance information of the color vector.
- "intensity component" refers to the projection of a color vector in a color space, on an axis comprising luminance values and not comprising chromaticity information. An intensity component can contain a part or the whole luminance information of the color vector.
- "chi-square distance" refers to distance between two normalized color histograms.

"color-faithful" refers to a 2D image obtained from a color volume while accurately reproducing the colors of the volume, that is while minimizing a distance metric between the distribution of the chromaticity components of the obtained 2D image and of the original 3D stack. Preferentially, the distance metric is the chi-square distance ($\chi$) between the color histogram of the 2D image and the color histogram of the color volume.

"processor" should not be construed to be restricted to hardware capable of executing software, and refers in a general way to a processing device, which can for example include a computer, a microprocessor, an integrated circuit, or a programmable logic device (PLD). The processor may also encompass one or more Graphics Processing Units (GPU), whether exploited for computer graphics and image processing or other functions. Additionally, the instructions and/or data enabling to perform associated and/or resulting functionalities may be stored on any processor-readable medium such as, e.g., an integrated circuit, a hard disk, a CD (Compact Disc), an optical disc such as a DVD (Digital Versatile Disc), a RAM (Random-Access Memory) or a ROM (Read-Only Memory). Instructions may be notably stored in hardware, software, firmware or in any combination thereof.

BRIEF DESCRIPTION OF THE DRAWINGS

The following detailed description will be better understood when read in conjunction with the figures. For the purpose of illustrating, the invention is shown in the preferred embodiments. It should be understood, however, that the application is not limited to the precise color space, invertible transformation, object of interest and aspect shown in the figures. Accordingly, it should be understood that where features mentioned in the appended claims are followed by reference signs, such signs are included solely for the purpose of enhancing the intelligibility of the claims and are in no way limiting on the scope of the claims.

While various embodiments have been described and illustrated, the detailed description is not to be construed as being limited hereto. Various modifications can be made to the embodiments by those skilled in the art without departing from the true spirit and scope of the disclosure as defined by the claims.

DETAILED DESCRIPTION

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The present invention relates to a computer implemented method for generating an extended depth-of-field (EDF) image from a volume comprising a stack of 2D microscopy images acquired at different focal depths in a z-direction. The EDF image obtained with the present method is characterized by an elevated color fidelity and fine detail recovery. The volume of the present method is a color volume.

Figure 4:
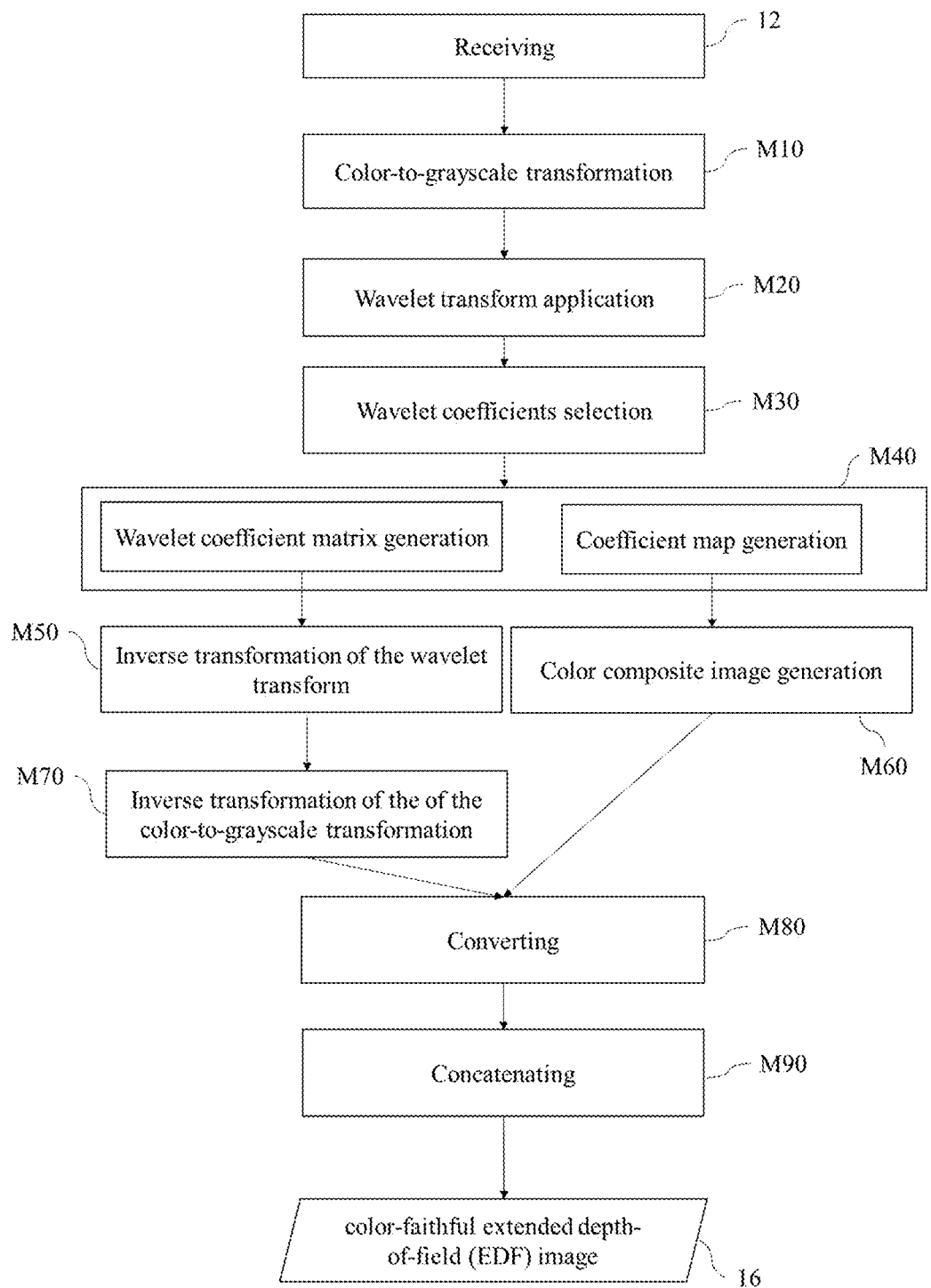
FIG. 4 is a flow-chart schematically representing the main steps of the method of the present invention.

According to the representation of FIG. 4, the method used in the present invention comprises a receiving step to receive a volume 1. According to one embodiment, the volume 1 is a stack of 2D color images acquired by moving a microscopy slide comprising an object of interest along a z-direction parallel to the optical axis of a bright-field microscope. The volume 1 has dimension (N, M, L) and each voxel has a value I(n, m, l). The set of voxels of the volume 1 having a fixed l, comprised between 1 and L, are 2D images acquired at different focal depths in a z-direction using a microscope. The L dimension is equal to the number of acquired images. The l index of a voxel is the focal depth at which the initial image comprising said voxel has been acquired. In the present invention, the L dimension of the volume 1 is equal or superior to 2, so that said volume 1 is a stack of 2D images comprising at least two 2D-images acquired at different focal depths.

The volume 1 according to the present invention may be represented in any color space. In one embodiment, the initial color volume, i.e. the stack of 2D images, is an RGB volume.

The present invention will be better understood when read in conjunction with the drawings. For the purpose of illustrating, the method M is shown in the preferred embodiment. It should be understood, however that the application is not limited to this particular embodiment and that the drawings are not intended to limit the scope of the claims to the embodiment therein depicted. Accordingly, it should be understood that where features mentioned in the appended claims are followed by reference signs, such signs are included solely for the purpose of enhancing the intelligibility of the claims and are in no way limiting on the scope of the claims.

Moreover, it will be appreciated by those skilled in the art that any flow charts, flow diagrams, and the like represent various processes which may be substantially represented in computer readable media and so executed by a computer or processor, whether or not such computer or processor is explicitly shown.

Figure 1:
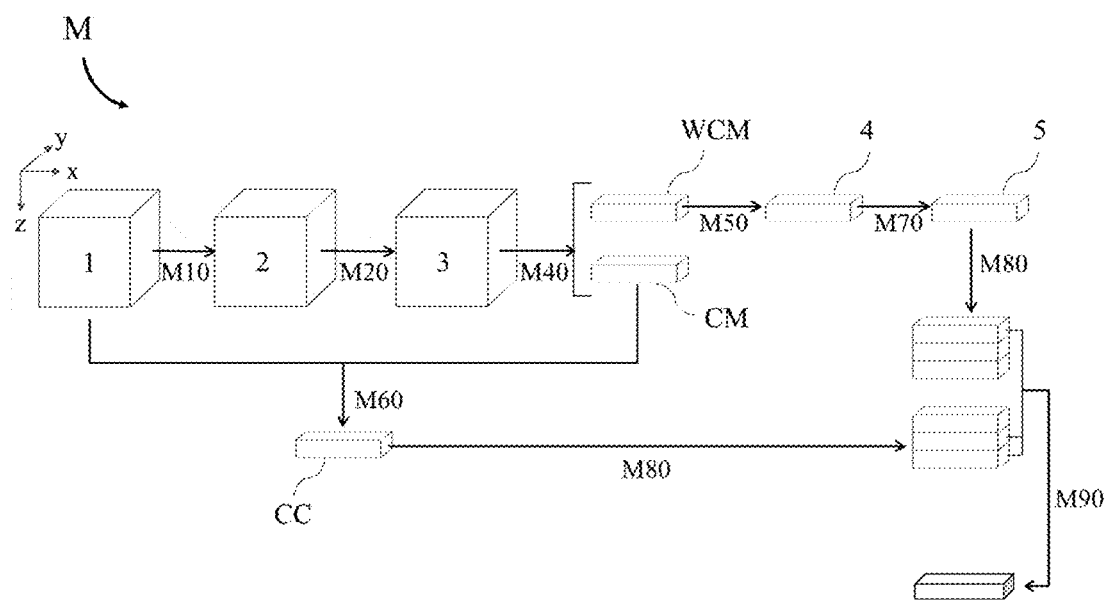
FIG. 1 is a flow-chart schematically representing a first non-limiting example of the method of the present invention.

As represented in FIG. 1, the method M herein described may comprise a step of generating a grayscale volume 2 from a color volume 1 by applying M10 an invertible color-to-grayscale transformation to said color volume 1.

In FIG. 1, the color volume 1 is schematically represented as a cube.

The method M optionally comprises a step of preprocessing the received color volume 1 before generating the grayscale volume 2. The preprocessing step may notably comprise a transformation of the color volume 1, e.g. decompression to proper decompression standard(s).

In advantageous modes, the preprocessing step may comprise a standardization phase. This may enhance the efficiency of the downstream processing of the volume 1. Such a standardization may be particularly useful when several color volumes 1 originating from different sources (including possibly different imaging systems) are processed with the method of the present disclosure.

The color-to-grayscale transformation need to be an invertible transformation, in order to convert back the grayscale EDF image 4, which is obtained after applying M50 an inverse wavelet transformation, to a color image.

In one embodiment, the color-to-grayscale invertible transformation may be a principal component analysis (PCA) transformation; in this particular embodiment, its inverse transformation is an inverse PCA allowing to reconstruct the original color variables from the principal components.

Since invertible color-to-grayscale transformations cause loss of color information, they need to be followed by a color reconstruction strategy. The steps allowing to obtain the color reconstruction according to the present method are detailed hereunder.

The method M of the present invention comprises a step M20 of applying a wavelet transform to the grayscale volume 2. The application of the wavelet transform allows to obtain a 3D wavelet coefficient matrix 3 having (N, M, L) dimension, wherein the value of each voxel having a (n, m, l) index comprises a set of wavelet coefficients. Said set of coefficients comprises at least four wavelet coefficients. The term "3D" refers to a three-dimensional matrix. The wavelet coefficient matrix 3 is a 3D matrix since it has dimension (N, M, L).

In the present invention, the color volume 1, the greyscale volume 2 and the 3D wavelet coefficient matrix 3 are three-dimensional matrices having dimension (N, M, L); whereas the wavelet coefficient matrix WCM, the coefficient map CM, the grayscale EDF image 6, the color composite image CC, the color EDF image 7 and the color-faithful extended depth-of-field (EDF) image are 2D, i.e. bi-dimensional matrices having dimension (N, M).

The step M20 of applying a wavelet transform to the grayscale volume 2 is performed in parallel on each set of N×M voxels of the grayscale volume 2 having a same l index and (n, m) index going from (1,1) to (N, M). Therefore, for a grayscale volume 2 having (N, M, L) dimension, L wavelet transforms are applied in said step M20.

Preferentially, the wavelet transform applied in step M20 is a stationary wavelet transform (SWT) because among wavelet-based methods with reconstructed colors, SWT-EDF achieves the best color fidelity. This is particularly advantageous in case the image obtained with the present method M, after the concatenating step M90, is further segmented. In fact, SWT-EDF outperforms both CWT-EDF and "best-focus" methods according to the common segmentation evaluation metric Intersection over Union (IoU).

A wavelet transform produces a decomposition of a signal as wavelet coefficients, said wavelet coefficients comprising approximation coefficients and detail coefficients. In the context of images, the wavelet transform is known as a decomposition of the original image into sub-images of wavelet coefficients. This decomposition is reversible, the original image can be reconstructed from the wavelet coefficients by applying the inverse wavelet transform. In particular, a wavelet transform of an image is computed by applying a first decomposition to each row of pixels of the image and then a second decomposition to each column of the result of the first decomposition. One level of wavelet decomposition of an image is the result of said first and second decompositions, i.e. the row decomposition and the column decomposition. One level of wavelet decomposition of an image produces four matrices of wavelet coefficients (sub-images). The values of the pixels of said sub-images comprise the wavelet coefficients. However, several levels of subsequent decomposition may be performed. At each level of decomposition, four sub-images are obtained: three "detail" sub-images comprising the details of the original image and a fourth "approximation" sub-image comprising an approximation of the original image. The values of the pixels of said sub-images comprise the wavelet coefficients. In particular, the values of the pixels of the three "detail" sub-images comprise: in a first sub-image, the horizontal detail coefficients; in a second sub-image, the vertical detail coefficients; and, in a third sub-image, the diagonal detail coefficients. Said horizontal detail coefficients, vertical details coefficients and diagonal detail coefficients are a function of the horizontal details, vertical details and diagonal details of the original image, respectively. The values of the pixels of the fourth approximation sub-image comprise the approximation coefficients. Said approximation coefficients are a function of the approximation of the original image. In practice, at each level of decomposition the image is filtered with a high-pass filter to generate the detail coefficients and with a low-pass filter to generate the approximation coefficients. At each further level of decomposition, such filtering is performed on the image obtained in the previous decomposition step. After one or more decomposition levels, the original image can be reconstructed by applying an inverse wavelet transform on the decomposition.

In the method M according to the present invention, the wavelet transform applied in step M20 comprises one level of decomposition, hence it decomposes each image of the grayscale volume 2 in four sub-images comprising the wavelet coefficients. By image of the grayscale volume 2 is meant the set of N×M voxels of the grayscale volume 2 having a same l index, so that the $l^{th}$ image of the grayscale volume 2 is the set of voxels having a fixed l and (n, m) index going from (1,1) to (N, M).

The present method M also comprises a selection step M30 where for each group of L voxels of the 3D wavelet coefficient matrix 3 having a same (n, m) index and a l index going from 1 to L, the step is configured to select a set of wavelet coefficients using a predefined coefficient selection rule. Said set of wavelet coefficients comprise at least one detail coefficient or approximation coefficient from the sub-images defined hereabove.

In one embodiment, the whole set of wavelet coefficients is used in the further steps of the present invention.

In one embodiment, one subset of wavelet coefficients is selected from the whole set of wavelet coefficients, and said subset is further used to compute the 2D coefficient map CM. In this particular embodiment, several 2D coefficient maps may be computed; in particular, each of the 2D coefficient maps is computed based on a different subset of wavelet coefficients; then one 2D coefficient map is obtained by combining the several 2D coefficient maps.

The coefficient selection rule applied in step M30 may be any coefficient selection rule known by a person skilled in the art. In particular, the coefficient selection rule is adapted for grayscale images or volumes. In the case of multi-channel images, applying the coefficient selection rule on every color channel and merging the results can produce false colors; it is therefore necessary to convert the initial color image to a grayscale image, then to compute a 2D greyscale EDF image, finally to perform a color reconstruction.

In the wavelet coefficient selection step M30, one or more coefficient selection rules may be applied.

The method M of the present invention may further comprise a step of generating M40:
- a 2D wavelet coefficient matrix WCM wherein the value WCM(n, m) of each pixel having a (n, m) index is the set of wavelet coefficients selected from the 3D wavelet coefficient matrix 3 by the coefficient selection rule;
- a 2D coefficient map CM, wherein the value CM(n, m) of each pixel having a (n, m) index is the l index of the voxel of the 3D wavelet coefficient matrix 3 that comprises the set of wavelet coefficients selected by the coefficient selection rule.

For instance, the value of the pixel CM(2, 3) comprises the l index of the voxel of the 3D wavelet coefficient matrix 3 selected among all the voxels having a n index equal to 2, a m index equal to 3, and a l going from 1 to L.

According to one embodiment, in the selection step M30 a first subset of wavelet coefficients is selected using a first predefined coefficient selection rule and a second subset of wavelet coefficients is selected using a second predefined coefficient selection rule. In this embodiment, the step of generating M40 a 2D wavelet coefficient matrix WCM and a 2D coefficient map CM comprises multiple steps M41, M42, M43 and M44.

The step M41 consists in generating a first 2D wavelet coefficient matrix and a first 2D coefficient map from the first subset of wavelet coefficients. In this embodiment, the step M41 is followed by a step M42 of generating a second 2D wavelet coefficient matrix and a second 2D coefficient map from the second subset of wavelet coefficients. Finally, the step M43 combines the first and the second 2D coefficient maps, so as to obtain one final 2D coefficient map CM. Based on said final 2D coefficient map CM, a 2D wavelet coefficient matrix WCM is generated in step M44. The value WCM(n, m) of each pixel of the 2D wavelet coefficient matrix WCM is the set of coefficients of the 3D wavelet coefficient matrix having a (n, m) index and having a l index equal to the value CM(n, m) of the final 2D coefficient map CM.

The step M43 of combining the first and the second 2D coefficient maps, so as to obtain one 2D coefficient map CM, may comprise multiple steps. In particular, it may comprise:
- first, filtering the first 2D coefficient map and the second 2D coefficient map, preferentially using a median filter;
- secondly, averaging the first and the second 2D coefficient maps;
- finally, rounding the averaged 2D coefficient map so as to obtain one 2D coefficient map CM.

In one embodiment, the median filter is a 3×3 median filter.

In one embodiment in which a first and a second subset of wavelet coefficients are selected using a first and a second coefficient selection rule respectively, two 2D wavelet coefficient matrices and two 2D coefficient maps are generated. In the first 2D wavelet coefficient matrix, the value of each pixel having a (n, m) index is the first subset of wavelet coefficients selected from the 3D wavelet coefficient matrix 3 by the first coefficient selection rule. In the second 2D wavelet coefficient matrix, the value of each pixel having a (n, m) index is the second subset of wavelet coefficients selected from the 3D wavelet coefficient matrix 3 by the second coefficient selection rule. In the first 2D coefficient map, the value of each pixel having a (n, m) index is the l index of the voxel of the 3D wavelet coefficient matrix 3 comprising the first subset of wavelet coefficients selected by the first coefficient selection rule. In the second 2D coefficient map, the value of each pixel having a (n, m) index is the l index of the voxel of the 3D wavelet coefficient matrix 3 comprising the second set of wavelet coefficients selected by the second coefficient selection rule.

According to one particular embodiment, the first selection rule is applied to select the most relevant coefficients from the subset of coefficients comprising detail coefficients, and the second selection rule is applied to select the most relevant coefficients from a subset of coefficients comprising the approximation coefficients. The detail coefficients comprise the horizontal detail coefficients, the vertical detail coefficients and the diagonal detail coefficients. In this particular embodiment, the first coefficient selection rule comprises:
- calculating for each voxel of the 3D wavelet coefficient matrix having a (n, m, l) index, the sum of the absolute value of the horizontal detail coefficient, vertical detail coefficient and diagonal detail coefficient having a (n, m, l) index;
- selecting among all the voxels of the 3D wavelet coefficient matrix having a (n, m) index and a l index going from 1 to L, the voxel comprising the highest sum of the absolute values of the horizontal detail coefficient, vertical detail coefficient and diagonal detail coefficient.

In this embodiment, the second coefficient selection rule comprises:
- calculating for each voxel of the 3D wavelet coefficient matrix having a (n, m, l) index, the variance of the Laplacian of the approximation coefficient having a (n, m, l) index;
- selecting among all the voxels of the 3D wavelet coefficient matrix having a (n, m) index and a l index going from 1 to L, the voxel comprising the highest absolute value of the variance of the Laplacian of the approximation coefficient.

In this embodiment, the first 2D wavelet coefficient matrix comprises information about the image details, whereas the second 2D wavelet coefficient matrix is a smoothened representation of the image due to the denoising effect resulting from the low-pass filter of the wavelet transform.

According to one embodiment, the method comprises a step of applying M50 an inverse transformation of the wavelet transform to the 2D wavelet coefficient matrix WCM so as to obtain a 2D grayscale EDF image 4.

In one embodiment, the present method comprises a step of generating M60 a 2D color composite image CC, wherein the value CC(n, m) of each pixel having (n, m) index is the value I(n, m, l) of the voxel of the color volume 1 having a l index equal to the value CM(n, m) of the 2D coefficient map CM.

In one embodiment, the method also comprises a step M70 of applying an inverse transformation of the invertible color-to-grayscale transformation to the 2D grayscale EDF image 4 so as to obtain a 2D color EDF image 5.

In one embodiment, the method also comprises a step M80 of converting the 2D color composite image CC and the 2D color EDF image 5 into a color space comprising at least one chromaticity component and at least one intensity component.

The term color space refers to the mathematical representation of a color in a coordinate axis system, in which each color is defined by a vector, the projections of the vector on the axis of the coordinate axis system being the different components of the color in said color space.

Most color spaces use three components to represent a color. Conventionally, biomedical images are acquired by devices such as cameras and scanners whose sensors comprise three channels, namely, red (R), green (G), and blue (B), hence generating an image in the RGB color space. In the RGB color space, R, G and B components are highly correlated; moreover, luminance information is not available. Therefore, for some applications, a conversion, as in step M80, from the RGB color space to another color space with a different coordinate axis system is suitable. Each coordinate axis of the color space comprises a color information, said information may be luma values, the luminance, a function of luminance; or alternatively the chrominance (combination of a chroma value and a luma value) or a function of chrominance. Preferentially, in the color space each coordinate axis comprises either chromaticity information, i.e. chrominance or a function of chrominance, or intensity information, i.e., luma values or luminance or a function of luminance; and none of the coordinate axis comprises a combination of said chromaticity information and intensity information.

Contrarily to RGB, color spaces such as YUV, YES, $YT_1T_2$, CIE L*a*b*, YcbCr, CIE L*U*V*, HSV comprise at least one coordinate axis which only comprises intensity information and no chromaticity information, and at least one axis which only comprises chromaticity information and no intensity information. In other words, each of these color spaces comprises at least two axes in which the intensity and chromaticity information are separated.

More in particular, YUV, YES, $YT_1T_2$, CIE, L*a*b*, YcbCr, CIE L*U*V* comprise one luminance component and two chrominance components.

Inversely, the color space HSV comprises two the intensity components, which are hue and saturation, and one chromaticity component, which is brightness/value.

In the examples mentioned hereinabove, the color space of the conversion step M80 comprises three components. However, in an alternative embodiment, a four- or higher-dimensional color space may be used. These color spaces are typically used in printing and graphic design.

According to one embodiment, the conversion step M80 is configured to convert the 2D color composite image CC and the 2D color EDF image 5 into a YUV color space in which the luminance component Y is the intensity component while U and V are the chromaticity components.

According to another embodiment, the color space of the conversion step M80 is one of the following color spaces: CIE L*a*b*, YcbCr, CIE L*U*V*, HSV.

In one embodiment, the method further comprises the step M90 of concatenating the at least one chromaticity component of the 2D color composite image CC and the at least one intensity component of the 2D color EDF image 5, to obtain a color-faithful extended depth-of-field (EDF) image.

Accordingly, in the example mentioned hereinabove (conversion M80 of the 2D color composite image CC and the 2D color EDF image 5 into a YUV color space), the concatenating step M90 may comprise:
concatenating the U component of the 2D color composite image CC, the V component of the 2D color composite image CC, and the Y component of the 2D color EDF image 5.

Since the chromaticity information of the 2D color composite image CC is retrieved from the initial color volume 1 in the step of generating M60 the 2D color composite image CC, the 2D color composite image CC has elevated color fidelity compared to the volume 1. Since the detail information in the 2D color EDF image 5 is maximized by means of the coefficient selection rule, the 2D color EDF image 5 has elevated recovery of fine details from the color volume 1. Concatenating the intensity component of the 2D color EDF image 5 and the chromaticity components of the 2D color composite image CC advantageously allows to combine fine recovery of details from the color volume 1 and elevated color fidelity to the color volume 1. As a consequence, the method M allows to obtain a "color-faithful" extended depth-of-field (EDF) image with fine detail recovery from the initial volume 1.

In the particular embodiment represented in FIG. 1, the color space has one intensity component and two chromaticity components and in the concatenating step M90 the one intensity component of the color EDF image 7 and the two chromaticity components of the color composite image CC are concatenated. Therefore, in this particular embodiment, the color-faithful extended depth-of-field (EDF) image has one intensity component and two chromaticity components.

The color-faithful extended depth-of-field (EDF) image obtained in the concatenating step M90 may further be converted to any color space. Optionally, it is converted to the color space of the initial color volume 1. This may be an RGB color space. In another embodiment of the present invention, the color-faithful extended depth-of-field (EDF) image obtained is converted to a color space different than the color space of the initial volume 1.

As aforementioned, the color space of the conversion step M80 may a four- or higher-dimensional color space. In this case, after the concatenating step M90, the color-faithful extended depth-of-field (EDF) image may be converted into a color space having a lower number of components. This embodiment is particularly advantageous as the four- and higher-components of such color spaces usually comprise redundant information, in the sense that it can be derived from the first three components.

According to one embodiment, the color-faithful extended depth-of-field (EDF) image obtained in the concatenating step M90 is further segmented. Preferentially, the segmentation step is performed using a U-net segmentation model.

A non-limiting example of the steps M10 to M90 of the method according to the present inventions is represented in FIG. 1. In FIG. 1, the selection step M30 is not illustrated. Various modifications of this steps may be implemented in the steps M10 to M70 without departing from the result of obtaining a 2D wavelet coefficient matrix WCM, a 2D coefficient map CM, a 2D color composite image CC and a 2D color EDF image 5.

The method M of the present invention allows to obtain from a color volume 1, a 2D image with elevated color fidelity and fine detail recovery by concatenating, in a color space, the intensity component of the 2D color EDF image 5 and the chromaticity components of the color composite image 2D color composite image CC.

Figure 2:
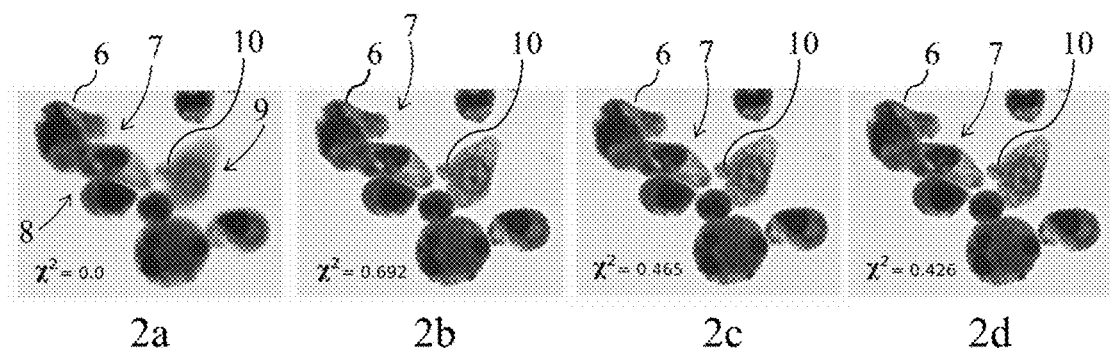
FIG. 2 represents non-limitative examples of images obtained at different steps according to the method of the present invention. 2a is an example of an image belonging to the initial 3D-stack. 2b represents the grayscale EDF image obtained from the color volume to which the image in 2a belongs. 2c represents a color EDF image obtained with a color assignment technique according to the prior art. 2d represents a color EDF image obtained with a color reconstruction technique according to the present invention.

One advantage of the present invention will be better understood when read in conjunction with FIG. 2. In the example represented in FIG. 2, the objects of interest are cells 6, some of which form cell clumps 7. In particular, FIGS. 2a, 2b and 2d represent non-limitative examples of images obtained before or after performing different steps of the method M of the present invention. FIGS. 2c and 2d represent, respectively: a color image obtained from the image in FIG. 2b after a color reassignment strategy according to the prior art; and a color image obtained from the image in FIG. 2b after a color reassignment strategy according to the present invention.

More in particular, FIG. 2a is an example of an image belonging to an initial color volume 1, comprising in-focus objects 8 and out-of-focus objects 9. In a color volume 1 of a biological sample, usually one color is predominant. In the image in FIG. 2a, the main color of all the objects is blue, with the exception of the element 10, whose main color is red. In the color volume 1, which the image in FIG. 2a belongs to, blue is the predominant color and red is a rare color. All objects in the images represented in FIGS. 2b to 2d are in-focus. FIG. 2b is an example of a 2D color EDF image 5 obtained as output of the step of applying M70 an inverse transformation of the invertible color-to-grayscale to the 2D grayscale EDF image 4. In particular, the image in FIG. 2b is obtained after inverse-PCA. The red color of the element 10 is lost after the inverse-PCA. FIG. 2c represents a 2D color EDF image 5 obtained from the image in FIG. 2b, in which a color assignment technique according to the prior art is applied. The red color of the element 10 following the color assignment strategy of the prior art is partially recovered. FIG. 2d represents a 2D color EDF image 5 obtained with the method M of the present invention. In particular, the image in FIG. 2d is obtained after converting the 2D color EDF image 5 and the 2D color composite image CC in the YUV color space, then concatenating the luminance component Y of the 2D color EDF image 5 and the U, V chromaticity components of the 2D color composite image CC. Contrarily to the image in FIG. 2c, in the image in FIG. 2d the red color of the element 10 is fully recovered and the element 10 has the same color as in the image in FIG. 2a.

Color fidelity obtained with the prior art and color fidelity obtained with the present method are compared by means of the chi-squared distance ($\chi$). In particular, the chi-squared distance ($\chi$) between the RGB normalized color histogram of each image represented in FIG. 2 and the color histogram of the image in FIG. 2a is calculated. The chi-squared distance ($\chi$) between the image in FIG. 2d and the image in FIG. 2a is smaller than the chi-squared distance ($\chi$) between the image in FIG. 2c and the image in FIG. 2a. These results show that the image in FIG. 2d obtained with the present method M advantageously has better color fidelity than the image in FIG. 2c obtained with a method of the prior art. In particular, the present invention ensures accurate reproduction of elements with rare colors, i.e., elements whose chrominance component is not the predominant chrominance component of the original color volume 1. The main issues observed in a 2D color EDF image 5 are: the lack of a color accuracy and the presence of artifact. The present method achieves the best color fidelity when compared to other wavelet-based methods followed by color reconstruction strategies. For instance, the example in FIG. 2 shows that an element with rare colors is better reproduced with the present method M than with the color reconstruction methods of the prior art.

Figure 3:
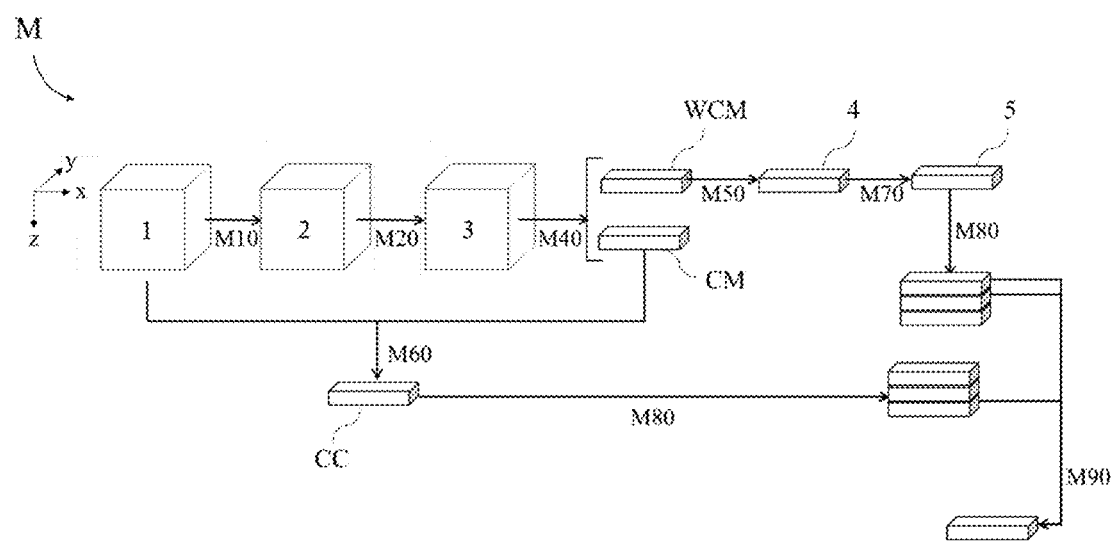
FIG. 3 is a flow-chart schematically representing a second non-limiting example of the method of the present invention.

FIG. 3 illustrates a particular embodiment of the method of the present invention.

More precisely, in the example depicted in FIG. 3, the color space of the conversion step M80 has three components. Accordingly, a result of the conversion step M80 is schematically represented as a pile of three prism, each prism representing one component.

As aforementioned, in the concatenating step M90 at least one intensity component of the color EDF image 7 and at least one chromaticity components of the color composite image CC are concatenated.

In the example of FIG. 3, the intensity components are represented by the top prism and the middle prism of the pile, and the chromaticity component is represented by the bottom prism of the pile.

For instance, the top prism may represent a hue (H) component, the middle prism may represent a saturation (S) component, and the bottom prism may represent a value (V) component. Accordingly, in this example the concatenating step M90 may comprise:
concatenating the H component of the 2D color composite image CC, the V component of the 2D color EDF image 5; and the S component of the 2D color EDF image 5.

In the example depicted in FIG. 3, the color-faithful extended depth-of-field (EDF) image has two intensity components and one chromaticity component.

The present invention also relates to a system 11 for analysis of a color volume 1 acquired from a biological sample.

The system 11 will be described with reference to FIG. 5.

Said system 11 comprises at least one input 12 adapted to receive a color volume 1. The color volume may be stored in one or more local or remote database(s) 13. The latter can take the form of storage resources available from any kind of appropriate storage means, which can be notably a RAM or an EEPROM (Electrically-Erasable Programmable Read-Only Memory) such as a Flash memory, possibly within an SSD (Solid-State Disk).

The system 11 comprises a processor 14 preferably configured to carry out the steps of the method M according to any one of the embodiments described above.

Though the presently described system 11 is versatile and provided with several functions that can be carried out alternatively or in any cumulative way, other implementations within the scope of the present disclosure include systems having only parts of the present functionalities.

Each of the system 11 is advantageously an apparatus, or a physical part of an apparatus, designed, configured and/or adapted for performing the mentioned functions and produce the mentioned effects or results. In alternative implementations, any of the system 11 is embodied as a set of apparatus or physical parts of apparatus, whether grouped in a same machine or in different, possibly remote, machines. The system 11 may e.g. have functions distributed over a cloud infrastructure and be available to users as a cloud-based service, or have remote functions accessible through an API.

In what follows, the modules are to be understood as functional entities rather than material, physically distinct, components. They can consequently be embodied either as grouped together in a same tangible and concrete component, or distributed into several such components. Also, each of those modules is possibly itself shared between at least two physical components. In addition, the modules are implemented in hardware, software, firmware, or any mixed form thereof as well. They are preferably embodied within at least one processor of the system 11.

According to one embodiment, the system 11 further comprises a visualization module for displaying the volume 1, the grayscale volume 2, the 2D color composite image CC, the 2D grayscale EDF image 4, the 2D color EDF image 5 and the color-faithful extended depth-of-field (EDF) image.

The visualization module may further display the 3D wavelet coefficient matrix 3, the 2D wavelet coefficient matrix WCM, the 2D coefficient map CM.

The visualization module may be directly connected to the GPU. According to a variant, the visualization module is external to the system 11 and is connected thereto by a cable or wirelessly for transmitting display signals. In this case, the system 11 comprises an interface for transmission or a connection adapted to transmit a display signal to an external display means such as for example an LCD or plasma screen or a video-projector.

Figure 5:
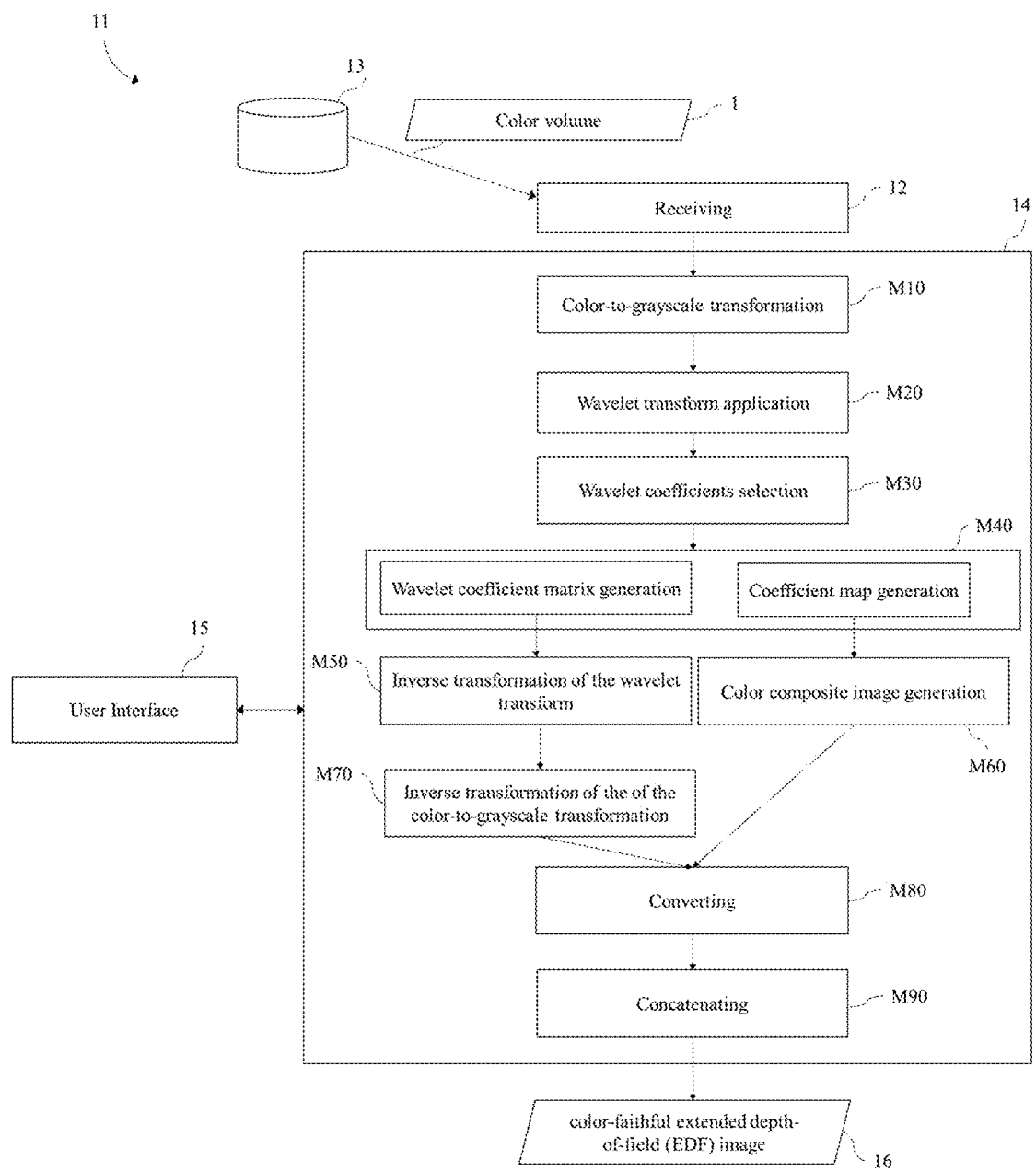
FIG. 5 is a block diagram representing schematically a particular mode of a system for generating a color-faithful extended depth-of-field EDF image from a color volume, compliant with the present disclosure.

The system 11 depicted in FIG. 5 is interacting with a user interface 15, via which information can be entered and retrieved by a user. The user interface 15 includes any means appropriate for entering or retrieving data, information or instructions, notably visual, tactile and/or audio capacities that can encompass any or several of the following means as well known by a person skilled in the art: a screen, a keyboard, a trackball, a touchpad, a touchscreen, a loudspeaker, a voice recognition system.

In one embodiment, the biological sample is a urine sample. According to this embodiment, the system 11 may comprise an automated digital cytology system configured to acquire a volume 1, the volume 1 comprising at least two 2D color images.

The present invention further relates to a computer program product for generating a color-faithful extended depth-of-field (EDF) image from a volume 1 obtained from a microscope, the computer program product comprising instructions which, when the program is executed by a computer, cause the computer to carry out the steps of the method according to any one of the embodiments described hereabove.

The computer program product to perform the method as described above may be written as computer programs, code segments, instructions or any combination thereof, for individually or collectively instructing or configuring the processor or computer to operate as a machine or special-purpose computer to perform the operations performed by hardware components. In one example, the computer program product includes machine code that is directly executed by a processor or a computer, such as machine code produced by a compiler. In another example, the computer program product includes higher-level code that is executed by a processor or a computer using an interpreter.

Programmers of ordinary skill in the art can readily write the instructions or software based on the block diagrams and the flow charts illustrated in the drawings and the corresponding descriptions in the specification, which disclose algorithms for performing the operations of the method as described above.

The present invention further relates to a computer-readable storage medium comprising instructions which, when the program is executed by a computer, cause the computer to carry out the steps of the method according to any one of the embodiments described hereabove.

According to one embodiment, the computer-readable storage medium is a non-transitory computer-readable storage medium.

Computer programs implementing the method of the present embodiments can commonly be distributed to users on a distribution computer-readable storage medium such as, but not limited to, an SD card, an external storage device, a microchip, a flash memory device, a portable hard drive and software websites. From the distribution medium, the computer programs can be copied to a hard disk or a similar intermediate storage medium. The computer programs can be run by loading the computer instructions either from their distribution medium or their intermediate storage medium into the execution memory of the computer, configuring the computer to act in accordance with the method of this invention. All these operations are well-known to those skilled in the art of computer systems.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

REFERENCES (1) color volume
(2) grayscale volume
(3) 3D wavelet coefficient matrix
(4) 2D grayscale EDF image
(5) 2D color EDF image
(6) cell
(7) cell clump
(8) in-focus object
(9) out-of-focus object
(10) red element
(11) system
(12) input
(13) database
(14) processor
(15) user interface
(16) output

The invention claimed is:

1. A computer implemented method for generating a color-faithful extended depth-of-field (EDF) image from a color volume of a biological sample having dimension (N, M, L) and values I(n, m, l), the voxels (n, m, l) for a fixed l going from 1 to L being images acquired at different focal depths in a z-direction using a microscope, said method comprising the following steps:
- a) receiving the color volume and generating a grayscale volume by applying an invertible color-to-grayscale transformation to said color volume;
- b) applying a wavelet transform on each set of N×M voxels of the grayscale volume having a same l index and (n, m) index going from (1,1) to (N, M), so as to obtain a 3D wavelet coefficient matrix wherein the value of each voxel having a (n, m, l) index comprises a set of wavelet coefficients;
- c) for each group of L voxels of the 3D wavelet coefficient matrix having a same (n, m) index and a l index going from 1 to L, selecting one set of wavelet coefficients using a predefined coefficient selection rule;
- d) generating:
    a 2D wavelet coefficient matrix WCM wherein the value WCM(n, m) of each pixel having a (n, m) index is the set of wavelet coefficients selected from the 3D wavelet coefficient matrix by the coefficient selection rule;
    a 2D coefficient map CM, wherein the value CM(n, m) of each pixel having a (n, m) index is the l index of the voxel of the 3D wavelet coefficient matrix that comprises the set of wavelet coefficients selected by the coefficient selection rule;
- e) applying an inverse transformation of the wavelet transform to the 2D wavelet coefficient matrix WCM so as to obtain a 2D grayscale EDF image;
- f) generating a 2D color composite image CC, wherein the value CC(n, m) of each pixel having (n, m) index is the value I(n, m, l) of the voxel of the color volume (1) having a l index equal to the value CM(n, m) of the 2D coefficient map CM;
- g) applying an inverse transformation of the invertible color-to-grayscale transformation to the 2D grayscale EDF image to obtain a 2D color EDF image;
- h) converting the 2D color composite image CC and the 2D color EDF image into a color space comprising at least one chromaticity components and at least one intensity component; and
- i) concatenating, the at least one chromaticity components of the 2D color composite image CC and the at least one intensity component of the 2D color EDF image, to obtain the color-faithful extended depth-of-field (EDF) image.

2. The method according to claim 1, wherein in the selection step a first subset of wavelet coefficients is selected using a first predefined coefficient selection rule and a second subset of wavelet coefficients is selected using a second predefined coefficient selection rule; and wherein the step of generating a 2D wavelet coefficient matrix WCM and a 2D coefficient map CM comprises:
    generating a first 2D coefficient map from the first subset of wavelet coefficients;
    generating a second 2D coefficient map from the second subset of wavelet coefficients;
    combining the first and the second 2D coefficient maps, so as to obtain one 2D coefficient map CM, and
    generating a 2D wavelet coefficient matrix WCM wherein the value WCM(n, m) of each pixel is the value of the voxel of the 3D wavelet coefficient matrix having a (n, m) index and having a l index equal to the value CM(n, m) of the obtained 2D coefficient map CM.

3. The method according to claim 2, wherein the step of combining the first and the second 2D coefficient maps comprises:
    filtering the first 2D coefficient map and the second 2D coefficient map, preferentially using a median filter;
    averaging the first and the second 2D coefficient maps; and
    rounding the averaged 2D coefficient map so as to obtain one 2D coefficient map CM.

4. The method according to claim 1, wherein the set of wavelet coefficients comprises at least four wavelet coefficients and the subset of wavelet coefficients comprises at least one wavelet coefficient.

5. The method according to claim 1, wherein the color-faithful extended depth-of-field (EDF) image is converted to a different color space, preferentially the color space of the color volume (1).

6. The method according to claim 1, wherein the invertible color-to-grayscale transformation is a principal component analysis (PCA).

7. The method according to claim 1, wherein wavelet transform applied in the applying step is a stationary wavelet transform (SWT).

8. The method according to claim 1, wherein the color volume is a biomedical image and the method further comprises a step of segmentation of the color-faithful extended depth-of-field (EDF) image.

9. A system for analysis of biological samples, said system comprising:
    at least one input adapted to receive a color volume;
    at least one processor configured to:
        generate a grayscale volume by applying (M10) an invertible color-to-grayscale transformation to said color volume;
        apply a wavelet transform on each set of N×M voxels of the grayscale volume having a same l index and (n, m) index going from (1,1) to (N, M), so as to obtain a 3D wavelet coefficient matrix wherein the value of each voxel having a (n, m, l) index comprises a set of wavelet coefficients;
        for each group of L voxels of the 3D wavelet coefficient matrix having a same (n, m) index and a l index going from 1 to L, select one set of wavelet coefficients using a predefined coefficient selection rule;
        generate:
            a 2D wavelet coefficient matrix WCM wherein the value WCM(n, m) of each pixel having a (n, m) index is the set of wavelet coefficients selected from the 3D wavelet coefficient matrix by the coefficient selection rule;
            a 2D coefficient map CM, wherein the value CM(n, m) of each pixel having a (n, m) index is the l index of the voxel of the 3D wavelet coefficient matrix that comprises the set of wavelet coefficients selected by the coefficient selection rule;
        apply an inverse transformation of the wavelet transform to the 2D wavelet coefficient matrix WCM so as to obtain a 2D grayscale EDF image;
        generate (M60) a 2D color composite image CC, wherein the value CC(n, m) of each pixel having (n, m) index is the value I(n, m, l) of the voxel of the color volume having a l index equal to the value CM(n, m) of the 2D coefficient map CM;
        apply an inverse transformation of the invertible color-to-grayscale transformation to the 2D grayscale EDF image to obtain a 2D color EDF image;

convert the 2D color composite image CC and the 2D color EDF image into a color space comprising at least one chromaticity components and at least one intensity component; and concatenate, the at least one chromaticity components of the 2D color composite image CC and the at least one intensity component of the 2D color EDF image, to obtain the color-faithful extended depth-of-field (EDF) image; and at least one output adapted to provide said color-faithful extended depth-of-field (EDF) image.

10. The system according to claim 9, wherein the biological sample is a urine sample and the system comprises an automated digital cytology system configured to acquire a color volume, the color volume comprising at least two 2D color images.

11. A bladder cancer detection apparatus according to claim 9.

12. A computer program product for analysis of biological samples, the computer program product comprising instructions which, when the program is executed by a computer, cause the computer to carry out the steps of the method according to claim 1.

13. A non-transitory computer-readable storage medium comprising instructions which, when the program is executed by a computer, cause the computer to carry out the steps of the method according to claim 1.

\* \* \* \* \*